United States Patent
Hobrock et al.

(10) Patent No.: US 7,310,423 B2
(45) Date of Patent: Dec. 18, 2007

(54) PROCESSING MULTIPLE ENCRYPTED TRANSPORT STREAMS

(75) Inventors: Lance Hobrock, Encinitas, CA (US); Boyko Boykov, Arlington Heights, IL (US); Matthew Herring, San Diego, CA (US); Ashish Tiwari, San Diego, CA (US); Mack Daily, Round Lake Park, IL (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/422,376

(22) Filed: Apr. 24, 2003

(65) Prior Publication Data

US 2004/0247122 A1    Dec. 9, 2004

(51) Int. Cl.
*H04N 7/167* (2006.01)
*H04J 3/02* (2006.01)

(52) U.S. Cl. .................. 380/241; 370/476; 725/31

(58) Field of Classification Search ............. 713/176, 713/177, 201; 380/212, 241; 725/31
See application file for complete search history.

(56) References Cited

U.S. PATENT DOCUMENTS

| | | | | |
|---|---|---|---|---|
| 4,829,569 A | * | 5/1989 | Seth-Smith et al. | 380/234 |
| 4,916,738 A | * | 4/1990 | Chandra et al. | 713/159 |
| 5,420,866 A | * | 5/1995 | Wasilewski | 370/426 |
| 6,157,955 A | * | 12/2000 | Narad et al. | 709/228 |
| 6,172,988 B1 | * | 1/2001 | Tiernan et al. | 370/473 |
| 2003/0046686 A1 | * | 3/2003 | Candelore et al. | 725/31 |

* cited by examiner

*Primary Examiner*—Matthew Heneghan
(74) *Attorney, Agent, or Firm*—Larry T. Cullen

(57) ABSTRACT

A single decryption engine is used for decrypting a plurality of encrypted transport streams. Packets in each of the plurality of encrypted transport streams are tagged with a tag value to indicate their origin stream. The tagged packets from the plurality of encrypted transport streams are merged into a merged transport stream. The packets in the merged transport stream are decrypted with the decryption engine to produce a decrypted merged transport stream. The decrypted merged transport stream is split into a plurality of decrypted transport streams, equal in number to the plurality of encrypted transport streams, by routing packets in the decrypted merged transport stream to specific decrypted transport streams according to their tag value. A null-packet padding technique, a gapped-clock technique and a multi-port static RAM controller technique are disclosed.

23 Claims, 3 Drawing Sheets

PROCESSING MULTIPLE ENCRYPTED TRANSPORT STREAMS

TECHNICAL FIELD

The present invention relates to video signal processing, and more particularly to processing multiple digital video signal streams.

BACKGROUND ART

Recent advances in cable and satellite distribution of subscription and "on-demand" audio, video and other content to subscribers have given rise to a growing number of digital set-top boxes (STBs, sometimes referred to as Digital Consumer Terminals or "DCTs") for decoding and delivering digitally broadcast programming. These set-top boxes often include additional circuitry to make them compatible with older analog encoding schemes for audio/video distribution. As the market for digital multimedia content of this type grows and matures, there is a corresponding growth of demand for new, more advanced features.

Video-on-demand (VOD) and audio-on-demand are examples of features made practical by broadband digital broadcasting via cable and satellite. Unlike earlier services where subscribers were granted access only to scheduled encrypted broadcasts (e.g., movie channels, special events programming, etc.), these on-demand services permit a subscriber to request a desired video, audio or other program at any time. Upon receiving the request for programming (and, presumably, authorization to bill the subscriber's account), the service provider then transmits the requested program to the subscriber's set-top box for viewing/listening. The program material is typically "streamed" to the subscriber in MPEG format for immediate viewing/listening, but can also be stored or buffered in the set-top box (typically on a hard-disk drive or "HDD") for subsequent viewing/listening.

Digital video broadcasts are typically transmitted (via cable or satellite) using a digital video compression scheme for encoding. Video compression is a technique for encoding a video "stream" or "bitstream" into a different encoded form (preferably a more compact form) than its original representation. A video "stream" is an electronic representation of a moving picture image.

The Motion Picture Association of America (MPAA) is a trade association of the American film industry, whose members include the industry's largest content providers (i.e., movie producers, studios). The MPAA requires protection of video-on-demand (VOD) content from piracy. Without security to protect content against unauthorized access, MPAA member content providers will not release their content (e.g., movies) for VOD distribution. Without up-to-date, high-quality content, the VOD market would become non-viable.

Encryption methods are continually evolving to keep pace with the challenges of video-on-demand (VOD) and other consumer-driven interactive services. With VOD, headend-based sessions are necessarily becoming more personalized. In this scenario, video streams are individually encrypted and have their own set of unique keys.

One of the best known and most widely used video compression standards for encoding moving picture images (video) and associated audio is the MPEG-2 standard, provided by the Moving Picture Experts Group (MPEG), a working group of the ISO/IEC (International Organization for Standardization/International Engineering Consortium) in charge of the development of international standards for compression, decompression, processing, and coded representation of moving pictures, audio and their combination. The ISO has offices at 1 rue de Varembé, Case postale 56, CH-1211 Geneva 20, Switzerland. The IEC has offices at 549 West Randolph Street, Suite 600, Chicago, Ill. 60661-2208 USA.

The international standard ISO/IEC 13818-2 "Generic Coding of Moving Pictures and Associated Audio Information: Video", and ATSC document A/54 "Guide to the Use of the ATSC Digital Television Standard" describes the MPEG-2 encoding scheme for encoding and decoding digital video (and audio) data. The MPEG-2 standard allows for the encoding of video over a wide range of resolutions, including higher resolutions commonly known as HDTV (high definition TV).

In MPEG-2, encoded pictures are made up of pixels. Each 8×8 array of pixels is known as a block. A 2×2 array of blocks is referred to as a macroblock. MPEG-2 video compression is achieved using a variety of well known techniques, including prediction (motion estimation in the encoder, motion compensation in the decoder), 2-dimensional discrete cosine transformation (DCT) of 8×8 blocks of pixels, quantization of DCT coefficients, and Huffman and run-length coding. Reference frame images, called "I-frames" are encoded without prediction. Predictively-coded frames known as "P-frames" are encoded as a set of predictive parameters relative to previous I-frames. Bidirectionally predictive coded frames known as "B-frames" are encoded as predictive parameters relative to both previous and subsequent I-frames. In MPEG-2 encoded video streams, all video data is packaged into fixed-size 188-byte packets for transport.

The MPEG-2 standard specifies formatting for the various component parts of a multimedia program. Such a program might include, for example, MPEG-2 compressed video, compressed audio, control data and/or user data. The standard also defines how these component parts are combined into a single synchronous bit stream. The process of combining the components into a single stream is known as multiplexing. The multiplexed stream may be transmitted over any of a variety of links such as, for example, Radio Frequency Links (UHF/VHF), Digital Broadcast Satellite Links, Cable TV Networks, Standard Terrestrial Communication Links, Microwave Line of Sight (LoS) Links (wireless), Digital Subscriber Links (ADSL family), Packet/Cell Links (ATM, IP, IPv6, Ethernet).

A fundamental component of any MPEG bit stream is an elementary stream (ES). A "program" comprises a plurality of ESs. Each ES is provided as an input to an MPEG-2 processor (e.g. a video compressor) which formats the ES into a series of Packetized Elementary Stream (PES) packets. A PES packet may be a fixed (or variable) sized block, with up to 65536 bytes per block and a six byte protocol header (first field of the PES Header). Typically, a PES contains an integer number of ESs.

The PES header starts with a three-byte start code, followed by a one-byte stream ID and a two-byte length field (the protocol header). The MPEG-2 standard defines a number of stream IDs. Following the protocol header are PES Indicators that provide formatting/encoding information about the stream, to assist in decoding. These PES Indicators include information about whether encryption is used, the encryption method, the priority of the current PES packet, an indicator of whether the payload starts with an audio or with a video start code, copyright information, and an indicator of whether the PES is an original or a copy. A one-byte flag field completes the PES header. The information in the PES header is, generally speaking, independent of the transmission method being used.

The MPEG-2 standard defines two forms of multiplexing (combining of ESs into a single stream):

MPEG Program Stream A group of tightly coupled PES packets referenced to a common time base. Such streams are suited for transmission in a relatively error-free environment and enable easy software processing of the received data. This form of multiplexing is used for video playback and for some network applications.

MPEG Transport Stream Each PES packet is broken into fixed-sized transport packets, providing the basis of a general-purpose technique for combining one or more streams, possibly with independent time bases. This is suited for transmission in which there may be potential packet loss or corruption by noise, and/or where there is a need to send more than one program at a time.

The Program Stream is widely used in digital video storage devices, and also where the video is reliably transmitted over a network (e.g. video-clip download). Digital Video Broadcast (DVB) uses the MPEG-2 Transport Stream over a wide variety of underlying networks. Since both the Program Stream and Transport Stream multiplex a set of PES inputs, interoperability between the two formats may be achieved at the PES level. The discussion herein is directed mainly to processing the MPEG Transport Stream (TS).

A transport stream consists of a sequence of fixed sized transport packets of 188 bytes. Each packet comprises 184 bytes of payload and a four-byte header. One of the items in this four-byte header is the 13 bit Packet Identifier (PID) which plays a key role in the operation of the Transport Stream.

Typically, two elementary streams are sent in the same MPEG-2 transport stream (e.g., two elementary streams containing video and audio packets, respectively). Each packet is tagged with a PID value that identifies it as being associated with a specific PES. Typically, audio packets are tagged with a unique PID and video packets are tagged with a different PID. The actual PID values are arbitrary, but they necessarily have different values. Usually there are many more video packets than audio packets, so the two types of packets are usually not evenly spaced in time.

Accordingly, an MPEG transport stream (TS) is not time-division multiplexed, and packets with any PID may appear in the TS at any time. If no source packets are available, null packets (denoted by a PID value of 0x1FFF) are inserted into the TS to maintain a constant TS bit rate. PESs in a TS are not synchronized with one another; indeed the encoding and decoding delay for each PES may be different (and usually is different).

Single and Multiple Program Transport Streams

A TS may correspond to a single TV program, or multimedia stream (e.g. with a video PES and an audio PES). This type of TS is normally called a Single Program Transport Stream (SPTS).

An SPTS contains all of the information required to reproduce the encoded TV channel or multimedia stream. It may contain only audio and video PESs, but there are usually other types of PESs as well. Each PES in a TS shares a common time base. Although some equipment outputs and uses SPTS, this is not the normal form of stream transmitted over a DVB link.

In most cases one or more SPTS streams are combined to form a Multiple Program Transport Stream (MPTS). This larger aggregate also contains all the control information (Program Specific Information (PSI)) required to coordinate a DVB system, along with any other data which is to be sent.

Most transport streams consist of a number of related elementary streams (e.g. the video and audio portions of a TV program). Decoding of the elementary streams typically needs to be co-ordinated (synchronized) to ensure that the audio playback is in synchronism with the corresponding video frames. The elementary streams may be tightly synchronized (usually necessary for digital TV programs, or for digital radio programs), or unsynchronized (in the case of programs offering downloading of software or games, as an example). To aid in synchronization, time stamps may optionally be sent in the transport stream.

There are two types of time stamps:

The first type is usually called a reference time stamp. This time stamp is the indication of the current time. Reference time stamps are to be found in the PES syntax (ESCR), in the program syntax (SCR), and in the transport packet adaptation Program Clock Reference (PCR) field.

The second type of time stamp is called Decoding Time Stamp (DTS) or Presentation Time Stamp (PTS). These time stamps are inserted close to the material to which they refer (normally in the PES packet header). They indicate the exact moment where a video frame or an audio frame has to be decoded or presented to the user respectively. These rely on reference time stamps for operation.

To decode a particular transport stream, the PID values associated with relevant elementary streams (e.g., audio and video elementary streams) must be determined. The transport stream is then "filtered" for transport packets having those PID values. The "filtered" packets are then decoded. To aid in identifying which PID corresponds to which program, a special set of streams, known as Signaling Tables, are transmitted with a description of each program carried within the MPEG-2 Transport Stream. Signaling tables are transmitted via an independent PES, and are not synchronized with, e.g., audio and video elementary streams associated with a program stream (i.e., they are provided via an independent control channel).

Video or audio payload data is organized into PES packets before being broken up into fixed length transport packet payloads. A PES packet may be much longer than a transport packet. When segmenting PES packets for placement in transport packet payloads, the PES header is always placed immediately following a transport header. Subsequent portions of the PES packet are then distributed into a series of transport packets. Any "slack" space in the final transport packet of the series is padded with bytes=0xFF (all ones).

Each transport packet starts with a sync byte=0x47. (In the ATSC US terrestrial DTV VSB transmission system, this byte is not processed, but is replaced by a different sync symbol especially suited to RF transmission.)

At the receiving end of a multiplexed, MPEG-2 transmission stream (TS), the transmission stream must be de-multiplexed in order that digital data can be extracted therefrom.

For example, a multi program transmission stream (MPTS) stream may comprise a video packet, followed by an audio packet, followed by another video packet, followed by a program association table (PAT), followed by a program map table (PMT), followed by other packets (such as program guides), followed by another video packet, etc.

The tables, called Program Specific Information (PSI) in MPEG-2, consist of a description of the elementary streams that need to be combined to build programs, and a description of the programs. The PAT lists the PIDs of tables describing each program. The PMT defines the set of PIDs associated with a program (e.g., audio, video, . . . ).

Each PSI table is carried in a sequence of PSI Sections, which may be of variable length (but are usually small, c.f. PES packets). Each section is protected by a CRC (checksum) to verify the integrity of the table being carried. The length of a section allows a decoder to identify the next section in a packet. A PSI section may also be used for downloading data to a remote site. Tables are sent periodically by inserting them into the transmitted transport stream.

The transport packet comprises a header, adaptation fields, and a payload. The transport packet header comprises a sync byte, flags, a continuity counter, and a 13-bit packet ID (PID). PID 0x0000 is reserved for transport packets carrying a program association table (PAT). The PAT identifies PIDs associated with Program Map Tables (PMTs), which in turn identify PIDs of ESs associated with particular elements (e.g., audio, video, etc.) of a program.

Accordingly, decoding a transport stream involves:
 finding the PAT by selecting packets with PID=0x0000;
 determining PIDs for the PMTs;
 determining the PIDs for the elements of a desired program from its PMT (for example, a basic program will have a PID for audio and a PID for video); and
 detecting packets with the desired PIDs and routing them to an appropriate decoding process (i.e., an audio decoder for audio PES data and a video decoder for video PES data).

An outgrowth of digital set-top box (DCT) technology is set-top boxes (STBs) with embedded PVRs/DVRs (Personal Video Recorder/Digital Video Recorder), whereby video content can be recorded directly to a storage device (e.g., hard disk or local memory) for subsequent playback. As with conventional video recording applications (e.g., video cassette recorders—VCRs), it is often desirable to record one program "stream" while viewing another—an application that operates on two video streams simultaneously.

Another common application of modern set-top boxes, televisions, etc., is Picture-In-Picture (PIP), where an inset (thumbnail) display of a first video stream is overlaid on a full-screen display of a second video stream. Like simultaneous viewing and recording, PIP operates on two video streams simultaneously.

Historically, for analog television broadcasts, these dual-stream applications required "dual tuner" functionality— one tuner for receiving the program to be viewed, the other to receive the program to be recorded. Since most VCRs include an independent tuner for recording and a broadband pass-through capability, the "dual tuner" requirement is effectively satisfied. To provide the same capability, embedded DVR and PIP applications (when built into a single unit) must provide for the ability to decode at least two digital video streams simultaneously, either or both of which may be encrypted.

Generally, encryption of an MPEG-2 transport stream involves encryption of the data content of a transport stream, but not the structure thereof. That is, only the data payload portion of transport packets in a transport stream is encrypted, but the structure of the transport packets themselves (header, flags, framing, etc.) is sent in the clear (unencrypted). Encrypted and non-encrypted stream data can be mixed in a transport stream.

As described hereinabove, the encryption method (if any) used to encrypt a particular PES is identified in the PES header. Once it has been determined that a PES contains an encrypted payload (e.g., encrypted video or audio), then all transport packets with PIDs associated with that PES must be routed through a decryption mechanism prior to decoding. Typically, this decryption mechanism is a dedicated encryption engine, e.g., an integrated circuit (IC) chip or dedicated hardware specifically designed to perform the decryption function. One example of a chip with this type of decryption capability is Motorola's MC 1.7 (MediaCipher v1.7) Conditional Access Control chip.

GLOSSARY

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used in the description contained herein:

ASIC Application-specific integrated circuit

ATSC Advanced Television Systems Committee

CPS Cross-point switch

CPU Central processing unit (microprocessor)

DOCSIS Data Over Cable Service Interface Specification. A specification for implementing digital data communication over cable transmission networks.

DVB Digital Video Broadcasting Project

DVR Digital Video Recorder. A high capacity hard drive that is embedded in a set-top box (STB), which records video programming from a television set. DVRs are operated by personal video recording (PVR) software, which enables the viewer to pause, fast forward, and manage various other functions and special applications.

FIFO First-In, First-Out Memory Block

FPGA Field-programmable gate array

HDD Hard Disc Drive

HDTV High Definition Television

IC Integrated Circuit (chip)

IEEE 1394 A high-speed serial communications interface commonly referred to as "FireWire"

Mbps Mega (million) bits per second

MC 1.7 Motorola's MediaCipher 1.7 Access Control Chip for decrypting encrypted/protected digital multimedia broadcasts.

MPEG Motion Pictures Expert Group, a standards organization dedicated primarily to digital motion picture encoding.

MPEG-2 An encoding standard for digital television (officially designated as ISO/IEC 13818, in 9 parts)

MUX Multiplexer, or multiplexing

PAT Program association table

PID Packet ID (Identifier Code)

PID LSB Packet ID, Least Significant Bit

PID MSB Packet ID, Most Significant Bit

PMT Program map table

PSI Program Specific Information

PVR Personal Video Recording. Software and data services combination that allow the viewer to interactively select programming choices they want to watch or record on their digital video recorder from an electronic programming guide (EPG). Data services are provided, e.g., on a daily basis from the PVR provider.

QAM Quadrature Amplitude Modulation. A method of modulating digital signals onto an RF (Radio Frequency) carrier which involves both amplitude and phase coding, used by dial up modems and broadband networks.

QPSK Quadrature Phase Shift Keying. A method of modulating digital signals used by dial up modems and for digital delivery of television from DBS (Direct Broadcast) satellite RAM Random Access Memory SDTV Standard Definition Television Set-Top Set Top, or "set-top box" (STB). An electronic device that allows a television (TV) set to connect to the Internet, game systems or cable systems.

SRAM Static Random Access Memory

STB Set Top Box

TS Transport Stream

TV Television

VOD Video-On-Demand. The service of providing content through subscriber selection off a large menu of options, available to a viewer at any time.

SUMMARY OF THE INVENTION

According to the invention, a single decryption engine, such as Motorola's MC 1.7 (MediaCipher v1.7) Conditional Access Control chip, is used for decrypting a plurality of encrypted transport streams. Each transport stream comprises a plurality of packets. Packets in each of the plurality of encrypted transport streams are tagged with a tag value to indicate their origin stream. The tagged packets from the plurality of encrypted transport streams are merged into a merged transport stream. Packets in the merged transport stream are decrypted with the decryption engine to produce a decrypted merged transport stream. The decrypted merged transport stream is split into a plurality of decrypted transport streams equal in number to the plurality of encrypted transport streams, by routing packets in the decrypted merged transport stream to specific decrypted transport streams according to their tag value.

According to a feature of the invention, for each encrypted transport stream, a PID value is determined for each packet. The PID values are re-mapped according to a PID map table. The re-mapped PID values may be the tag values.

In one embodiment of the invention, a null-packet padding technique is employed.

In another embodiment of the invention, a gapped-clock technique is employed.

In a further embodiment of the invention, a multi-port static RAM controller technique is employed.

DETAILED DESCRIPTION OF THE INVENTION

Figure 1:
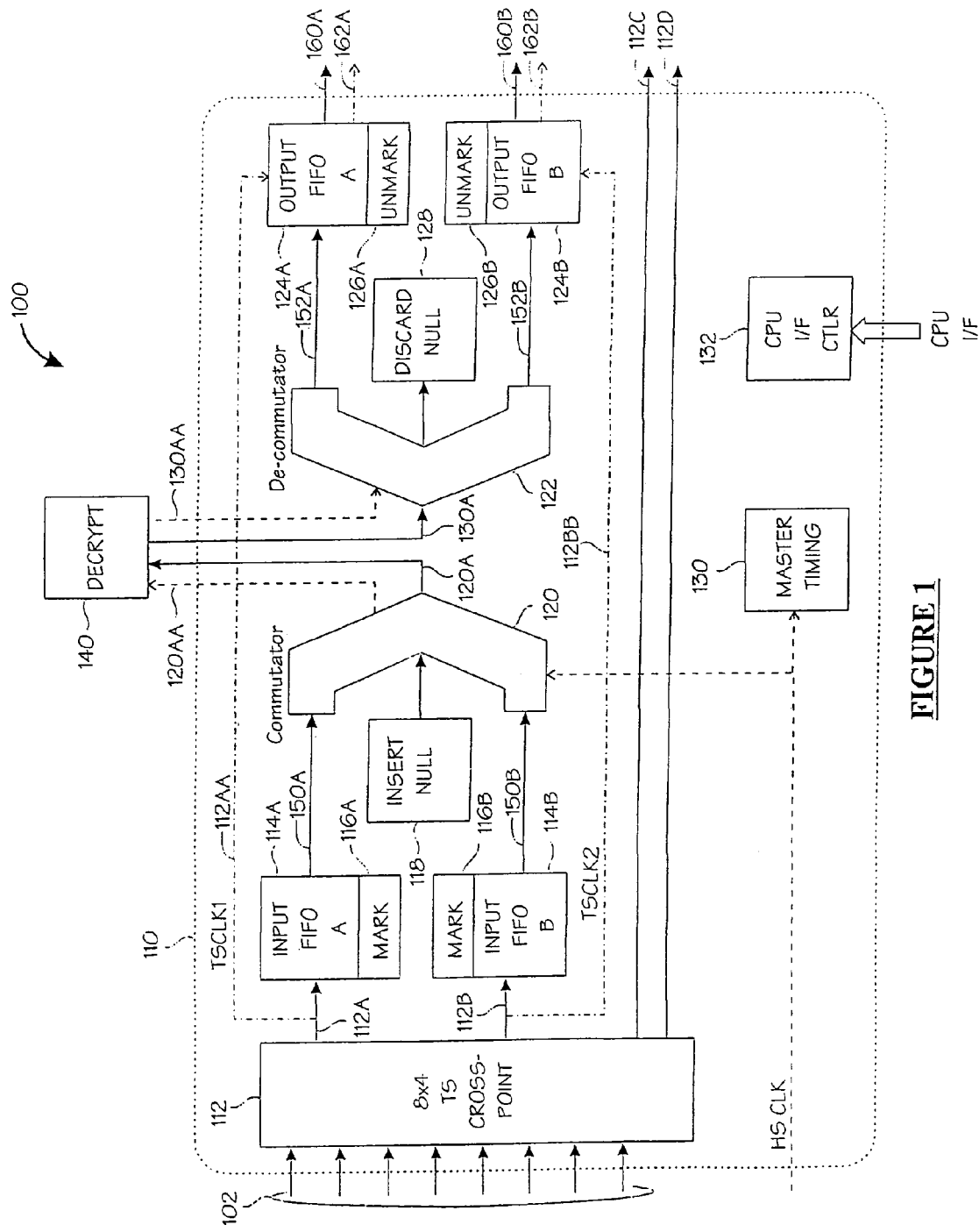
FIG. 1 is a block diagram of a system for decrypting two independent transport streams with a single decryption engine, employing a null-packet padding technique, according to the invention.

The present inventive technique relates to video signal processing, and more particularly to processing multiple digital video signal streams (transport streams). The present inventive technique is applicable to multifunctional high-end set-top boxes with replay TV (PVR/DVR), standard and HDTV capabilities, Internet access, etc. The transport stream sources can be, for example, satellite or cable tuners, DOCSIS modems, IEEE 1394, etc.

As described hereinabove, PIP and PVR/DVR (personal video recorder/digital video recorder) applications, and other similar applications in set-top boxes require that at least two independent video streams (e.g., transport streams) be decoded simultaneously. In many cases these will be multiplexed streams (e.g., single program transport streams (SPTS), each encoding multiple PESs (audio, video, etc.)). In the event that both streams are encrypted, it is necessary for both streams to be simultaneously decrypted. However, many decryption engines (chips, dedicated hardware, etc.) provide for decrypting only a single stream. This means that, under ordinary circumstances, two separate decryption engines would be required to decrypt two streams simultaneously.

An example of a single stream decryption engine of this type is Motorola's MediaCipher v1.7 conditional access control chip (MC 1.7), which is capable of decrypting encrypted transport stream (TS) packets for a single TS stream. The TS stream can be a compound (multiplex) stream encoding multiple PESs.

The present invention provides a technique for using a single decryption engine to decrypt multiple video streams. This is accomplished by merging the multiple video streams together into a single stream, decrypting the single stream, then splitting the merged stream back into separate, distinct streams. In merging the streams, packets from each stream are "tagged" with identifiers that identify their stream of origin. The identifiers are preserved through the decryption process, such that after decryption the merged stream can be split apart coherently into the original number of streams by examining the "tag" values.

Assuming that the decryption engine (e.g., MC 1.7) expects transport packets to be formatted according to the MPEG-2 standard, any tagging process that alters the format of the tagged packets would render them unreadable by the decryption engine, requiring additional formatting at the input of the decryption engine to put the tagged packets into a form that can be processed thereby, and at the output of the decryption engine to reformat the decrypted packets back into a tagged form that can be split apart.

In the interest of simplicity of encoding, a preferred embodiment of the present inventive technique accomplishes the "tagging" function by replacing each packet's PID with a new PIED to identify the packet's origin transport stream. In effect, the new PID value serves a dual purpose—it serves as a "tag" value to identify the origin stream of packets in the merged stream, and it maps the original PID values into a new set of values. Since typically there are relatively few PID values of interest in a transport stream, this can be readily accomplished by "zoning" the new PID values into a plurality of distinct ranges such that each range of new PID values indicates a particular transport stream. Specific values in each range of new PID values correspond to specific "original" PID values prior to replacement. The process of replacing original PID values with new PID values can be accomplished, for example, by means of look-up tables for each stream that map original PID values to new PID values in the appropriate range of new PID values.

For example, if two transport streams are to be processed by a single decryption engine, then the PID values would be divided into two discrete ranges with one range of PID values identifying packets as having originated from a first transport stream, and a second range of PID values identifying packets as having originated from a second transport stream. Assuming, for example, that ten "original" PID values of interest appear in transport packets in each of the two origin transport streams, then ten new PID values are selected from each range to represent each of the "original" PID values in the merged stream. The merged stream is then passed to the decryption engine, which produces a decrypted version of the merged stream (with new PID values intact).

After decryption, transport packets in the merged stream are separated back into two transport streams based upon the range in which their new PID values occur. At the same time, the new PID values are replaced with the original PID values by reversing the mapping process (e.g., by means of a look-up table).

If the input transport streams are slow enough that their aggregate data rate is less than that of the decryption engine, then the decryption engine must be "throttled back" in some way. Two possible ways of doing this are:

1) Operate the decryption engine at full speed and insert marked null packets into the merged stream ("pad" the merged stream with dummy packets) when no packets are ready for decryption at any input transport stream. The marked null packets are tagged with a value (PID value) that indicates that they are "filler" packets inserted into the merged stream.

2) Provide a "gapped" clock to the decryption engine such that when no decryption is in process, the clock to the decryption engine is stopped (gated off).

Those of ordinary skill in the art will understand that there are numerous ways to "throttle back" a decryption engine, depending upon the architecture and I/O (input/output) structure of the decryption engine. For example, if an enable signal (gating signal) is present on the decryption engine, it can be used to disable the decryption engine when no packets require decryption.

FIG. 1 is a block diagram of a system 100 for decrypting two independent transport streams 112A and 112B with a single decryption engine 140, by means of a "pre-multiplex" front-end 110 to the decryption engine 140. A front-end crosspoint switch 112 selects two transport streams 112A and 1121B from a plurality of transport stream sources 102. The transport stream sources 102 can be satellite or cable tuners, DOCSIS modems, IEEE 1394, etc. The crosspoint switch 112 also provides two "direct" or "bypass" outputs 112C and 112D that bypass the decryption engine 140.

Two input First-In, First-Out Memory Blocks (FIFOs) 14A and 114B are used as "elastic" buffers for packets in the transport streams 112A and 112B, respectively. As packets are stored in the FIFOs 114A and 114B, packet "marking" functions 116A and 1161B (MARK) replace their PID values according to a PID map built into the "marking" functions 116A and 116B. PID values for packets in transport stream 112A are processed by the marking function 116A, and packet values for packets in transport stream 1121B are processed by marking function 1161B. The marking functions 116A and 116B are adapted to provide replacement PID values in different (distinct) ranges. INPUT FIFO A 114A provides a buffered transport stream output 150A, and INPUT FIFO B 114B provides a buffered transport stream output 150B. The two buffered transport stream outputs 150A and 150B can be read asynchronously with respect to the transport streams 112A and 112B by virtue of the "elastic" nature of the FIFOs 114A and 114B.

A commutator function 120 merges the buffered transport streams 150A and 150B into a single merged transport stream 120A, which is provided to the decryption engine 140 for decryption. If no packet is ready (waiting) at the input FIFOs 116A and 116B, the commutator 120 inserts a null packet (null padding—shown as a separate "insert null" function 118) into the merged transport stream 120A to keep the data rate of the merged transport stream 120A at the (higher) data rate of the decryption engine 140. The inserted null packets are marked with a PID value that identifies them as "filler" or "pad" packets.

A master timing block 130 synchronizes decryption operations at the higher data rate (HS CLK) of the decryption engine 140. A decryption engine input clock 120AA synchronizes data input into the decryption engine 140. A decryption engine output clock 130AA (which may be the same as the input clock 120AA depending upon the architecture and I/O structure of the decryption engine) synchronizes data transfer out of the decryption engine 140 through a de-commutator function 122 and into a pair of output FIFOs 124A and 124B.

Each transport stream 112A and 112B has a respective transport stream clock 112AA (TSCLK1) and 112BB (TSCLK2), synchronous to data bits in the transport streams 112A and 112B. These transport stream clocks 112AA and 112BB are used to synchronize data transfer into the input FIFOs 114A and 114B and out of the output FIFOs 124A and 124B.

The decryption engine 140 decrypts packets in the merged transport stream 120A, providing a decrypted merged transport stream 130A at an output thereof. The de-commutator function 122 examines PID values of packets in the decrypted stream and routes the packets according to the PID values. If the PID value indicates that the packet originated in the transport stream 112A, then the de-commutator 122 routes the packet into OUTPUT FIFO A 124A. If the PID value indicates that the packet originated in the transport stream 112B, then the de-commutator 122 routes the packet into OUTPUT FIFO B 124B. If the PID value indicates that the packet is a null pad packet (dummy or filler packet) inserted by the commutator 120 (shown as "insert null" 118), then the packet is discarded. (i.e., not clocked into either FIFO; skipped. This is shown as a separate "discard null" function 128 in FIG. 1). As packets are stored in the output FIFOs 124A and 124B, packet "unmarking" functions 126A and 126B restore the original PID values by reversing the "marking" process described hereinabove. In a manner similar to that of the "marking" processes 116A and 116B, the unmarking processes 126A and 126B restore original PID values by means of a "reverse" PID map.

The output FIFOs 124A and 124B provide an elastic buffer between the decrypted high-speed merged stream clock 130AA used by the de-commutator 122 and the lower-speed transport stream clocks 112AA and 112BB. The output FIFOs 124A and 124B provide output transport streams 160A and 160B, which are decrypted versions of the transport streams 112A and 112B, respectively. Associated timing outputs 162A and 162B are also provided (derived from transport stream clocks 112AA and 112BB, respectively.

A CPU interface controller 132 provides an interface between a host controller (e.g., microprocessor) and the pre-multiplex front-end 110 for the purpose of writing PID maps, controlling the input crosspoint switch 112, etc.

Figure 2:
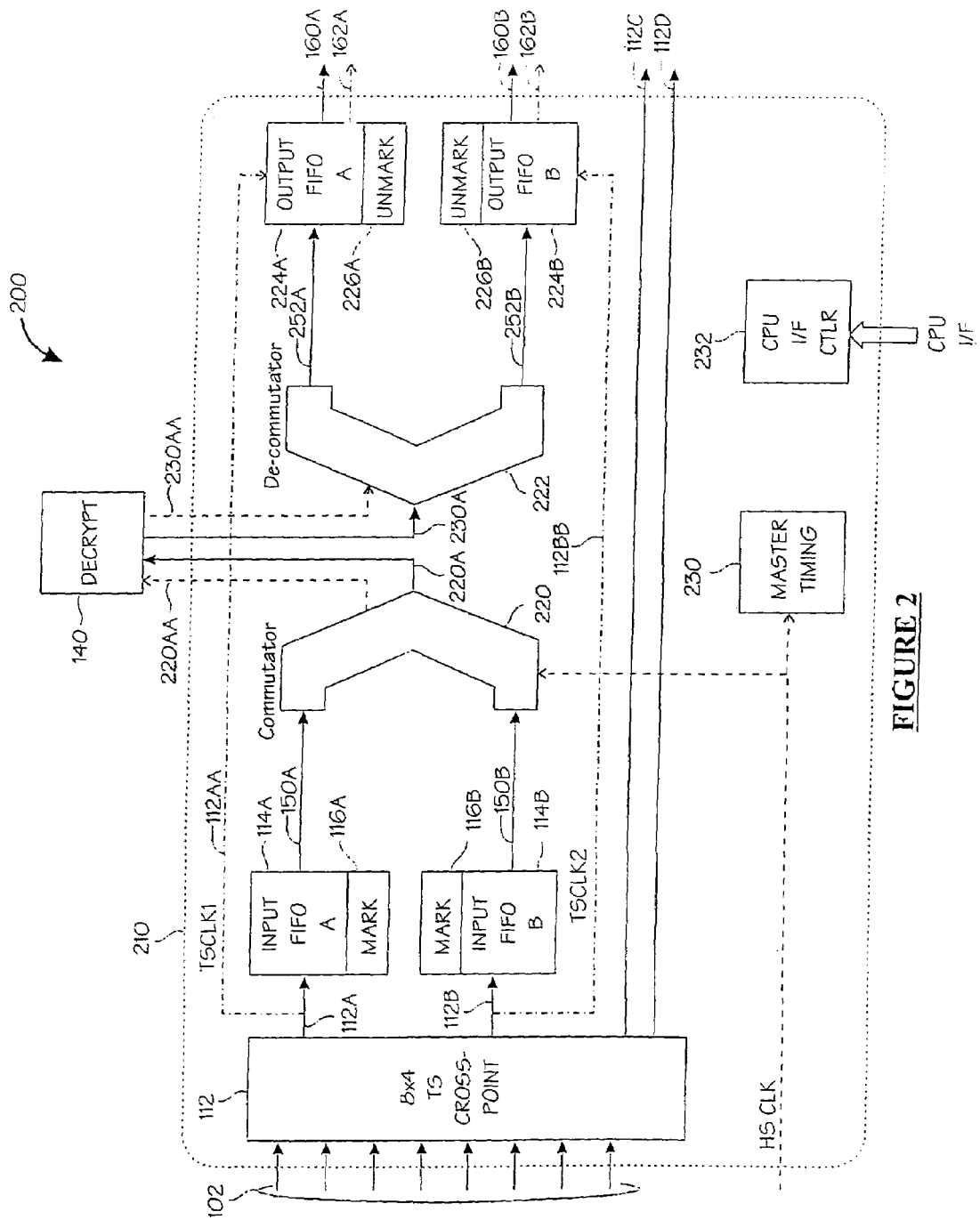
FIG. 2 is a block diagram of a system for decrypting two independent transport streams with a single decryption engine, employing a gapped-clock technique, according to the invention.

FIG. 2 is a block diagram of another system 200, similar to the system 100 of FIG. 1, for decrypting two independent transport streams 112A and 112B with a single decryption engine 140, by means of a "pre-multiplex" front-end 210 to the decryption engine 140. Unlike the system 100 of FIG. 1, however, the pre-multiplex front-end 210 uses a gapped-clock technique to synchronize data transfer in and out of the decryption engine 140. The system 200 is identical to the system 100 of FIG. 1 (elements which are the same have the same reference numerals), with the following exceptions (differences):

1) Master timing 230 (compare 130) controls the timing of the commutator 220, but does not directly control the decryption engine timing.
2) Commutator 220 (compare 120) provides a merged output stream 220A, but does not insert null packets (118). A gated clock 220AA (gapped clock) is provided to the decryption engine 140 by the commutator 220. When data is available on the merged stream output 220A of the commutator 220, then the high-speed clock (HS CLK) is passed through to the decryption engine 140. When no packets are ready at either input FIFO output transport stream 150A or 150B, the commutator "gates off" the gapped clock 220AA to the decryption engine 140.
3) De-commutator 222 operates on a decrypted merged stream output 230A from the decryption engine 140, but uses a gapped-clock timing reference 230AA resulting from the gapped clock 220AA provided to the decryption engine 140. The de-commutator 222 is virtually identical to the de-commutator 122 of FIG. 1, except that there is no need to discard null packets, since no null packets are inserted by the commutator 220. The de-commutator provides "gapped clock" split streams 252A and 252B to output FIFOs 224A and 224B, which perform essentially the same function as the output FIFOs 124A and 124B of FIG. 1. The "unmark" functions 226A and 226B are identical to the "unmark" functions 126A and 126B of FIG. 1.

A CPU interface controller 232 performs a similar function to that performed by the CPU interface controller 132 in FIG. 1. Other than gapped-clock timing, the overall function of the pre-multiplex front-end 210 is identical to that of the pre-multiplex front-end 110 of FIG. 1.

Preferably the pre-multiplex front-ends (110, 210) are implemented in a single-chip ASIC or FPGA. In so doing, considerable chip resources may need to be dedicated to the FIFOs due to the relatively large FIFO size required. Very often, FPGA FIFOs are quite "expensive" in terms of total chip resources (and chip cost), so a fairly large FPGA (large number of gates) may be required. This can be alleviated to some degree by implementing the FIFO storage in an external SRAM (Static Random Access Memory). Those of ordinary skill in the art will understand how to implement a FIFO function with an SRAM and associated logic (in the FPGA/ASIC) to implement counters and access arbitration.

In order to process two encrypted streams, the decryption engine must be fast enough to handle the aggregate data rate of the two streams. Ordinarily, it would not be possible to process two input transport streams whose aggregate data rate exceeds the capabilities of the decryption engine. However, many packets occur in transport streams that need not be decrypted. For example, null packets are often inserted as "fillers" in transport streams to maintain a constant data rate even though the actual data rate of the stream is considerably lower. Further, certain types of PES need not be decrypted (or are not used) for the purposes of a particular application. Selected PID values in each input stream can be interpreted as indicating that their associated packet requires decryption, while other PID values indicate that no decryption is required.

In order to conserve decryption engine bandwidth for high data rate transport streams (i.e., where the raw, aggregate data rate of the input streams exceeds the processing capability of the decryption engine), the present invention technique provides a technique for routing only selected packets in each transport stream to the decryption engine, thereby limiting the effective bandwidth required thereof. One aspect of the present inventive technique provides a mechanism by which transport packets not requiring decryption are effectively passed straight through to the output stream without being processed by the decryption engine.

Figure 3:
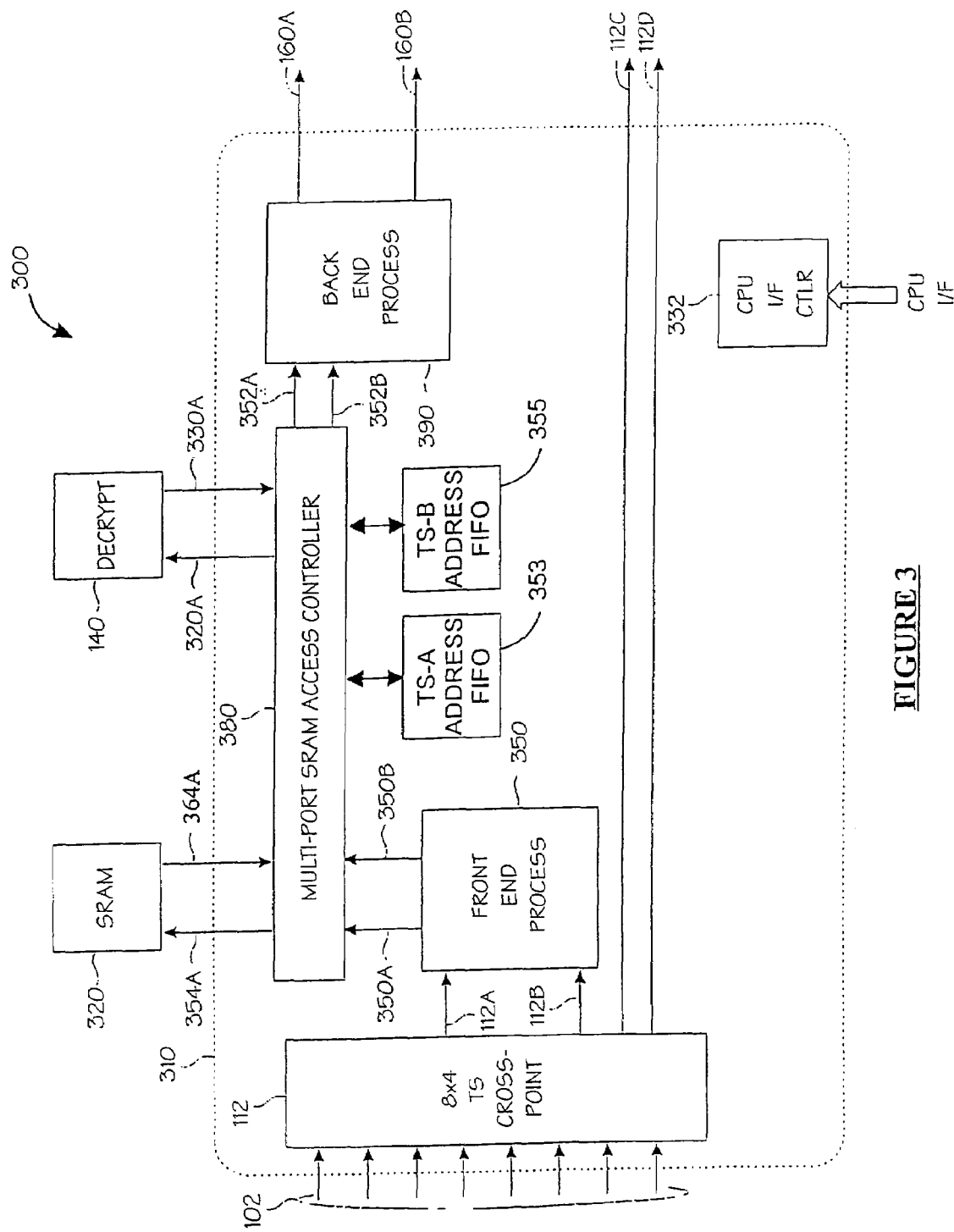
FIG. 3 is a block diagram of a system for decrypting two independent transport streams employing a multi-port static RAM controller, according to the invention.

FIG. 3 is a block diagram of a system 300 for decrypting two independent transport streams 112A and 112B by means of a pre-multiplex front end 310 to a decryption engine 140 that implements a multi-port static RAM controller (arbitrator) 380 for controlling access to an external Static RAM (SRAM) 320.

As in the pre-multiplex front-ends 110 and 210 of FIGS. 1 and 2, respectively, the pre-multiplex front-end 310 selects the independent transport streams 112A (TS-A) and 112B (TS-B) from a plurality of sources 102 by means of an input crosspoint switch 112. The crosspoint switch 112 also provides a pair of bypass outputs 112C and 112D. A front-end process 350 provides elastic buffering (FIFO functionality) between the transport streams' "native" clock speeds and an internal clock used by the multi-port SRAM controller 380 to control data transfers between the SRAM 320, the front-end process 350, the decryption engine 140 and a back-end process 390. External SRAM 320 buffer input 354A may be received from several sources within the pre-multiplex front-end 310. External SRAM 320 buffer output 364A may be provided to several recipients within the pre-multiplex front-end 310. Encrypted multiplexed transport stream 320A is input into the decryption engine 140 from the multi-port SRAM controller 380. Decrypted multiplexed transport stream 330A is output from the decryption engine 140 to the multi-port SRAM controller 380. The two transport streams TS-A and TS-B are associated with separate address FIFOs 353, 355 respectively, which are controlled by the controller 380. These FIFOs contain the SRAM address locations of packets that are flagged for decryption. The SRAM access controller 380 stores these address locations in the FIFO memories for the packets from the respective streams. The controller 380 uses these addresses to find the locations of packets to be sent to the decryption device and to put the decrypted packets back at the same address location upon return from the decryption device. This way, the continuity of the transport stream is preserved.

The front-end process 350 also includes PID re-mapping ("marking") functionality, and provides buffered (tagged) transport streams 350A and 350B (compare 150A, 150B) corresponding to independent transport streams 112A and 112B, respectively. In effect, the front-end process 350 performs functions analogous to the input FIFOs 114A, 114B, and marking functions 116A, 116B of FIG. 1, but with only sufficient FIFO depth to account for differences between the transport stream clocks and input clocks— between one and two packets in depth. By way of comparison, the FIFOs (114A, 114B, 124A, 124B) of FIG. 1 may be required to store many packets. Due to the relatively low cost of SRAM (compared to the RAM functions implemented in an FPGA or ASIC), this can yield considerable cost savings over a single-chip implementation that uses internal RAM or FIFO resources.

In order to provide the PID re-mapping functions, the front-end process 350 can maintain two separate mapping tables, one for the first transport stream 112A and one for the second transport stream 112B. Each re-mapping function replaces the PID value in each packet according to the mapping table for its respective transport stream. The re-mapping function combines comparison and PID replacement steps. The comparison function can be performed in several ways, e.g., through bit-wise serial, simultaneous parallel, or sequential parallel comparison. Each provides a tradeoff between comparison speed and complexity. The bit-wise serial method makes a bit-wise comparison of the input PID versus each PID in the comparison table. This is done by loading a copy of one element in the comparison array into a temporary register. The comparison function steps through each bit of the incoming PID and the bits in the temporary storage. Each PID is loaded and compared until the comparison array has been processed. The second method of PID re-mapping is the simultaneous parallel method. In this method, the PID extracted from the input transport stream (either 112A or 112B) is compared with all values in the comparison table simultaneously. Finally, PID comparison can be completed in sequential parallel format. The incoming PID is stored in a temporary register. PID values in the comparison table are extracted one at a time to compare with the incoming PID.

Using any of the comparison methods described above, or another suitable method now or hereafter known in the art, the PID value can be marked for re-map. Once a comparison hit is registered, the original PID value is pushed into an Original PID FIFO and the address for the packet storage is pushed into an Address Decryption FIFO. Meanwhile, the original PID in the stream is replaced with a re-mapped PID value. The re-mapped PID value accomplishes several goals. First, re-mapping the PIDs prevents PID conflicts inside the single-stream decryption device. Second, PID re-mapped values signal the origination stream of the packet; i.e., the first transport stream 112A or the second transport stream 112B. In this way, the PID re-map process only alters those packets that register a PID comparison hit. All packets with or without PID modification are stored in SRAM storage by the front-end process 350. The SRAM controller 380 can then control packet flow to and from the decryption device using the Decryption Address FIFO. Only those addresses from the Decryption Address FIFO are used to access the PID re-mapped packets in SRAM. Finally, after decryption, packets are returned to the same address in the SRAM with their Original PIDs restored from the Original PID FIFO.

The multi-port SRAM controller 380 implements larger-scale FIFO functionality, maintaining separate pointers and counters for the following six data transfer processes:

copying packet data from the buffered transport stream 350A to a merged "FIFO" area in SRAM;
copying packet data from the buffered transport stream 350B to the merged "FIFO" area in SRAM;
copying packet data from the merged FIFO area in SRAM to the decryption engine 140 (for packets marked as requiring decryption);
copying decrypted packet data from the decryption engine 140 to the merged FIFO area in SRAM such that the decrypted packet overwrites the original encrypted packet;
copying packet data from the merged FIFO area in SRAM to a first decrypted transport stream output 352A (depending upon PID value);
copying packet data from the merged FIFO area in SRAM to a second decrypted transport stream output 352B (depending upon PID value).

The multi-port SRAM controller 380 "time slices" access to the SRAM, cycling at a rate many times higher than the maximum transfer rate required at any input or output thereto. It implements an arbitration function; scanning requests for data transfers from any of the six aforementioned data transfer processes and servicing the requests in an time-interleaved fashion. The multi-port SRAM controller 380 copies packets from the buffered transport streams 350A and 350B into the merged FIFO area of the SRAM in the order that they become available from the front-end process 350. As a packet is written into the FIFO area from either buffered transport stream 350A or 350B, a packet is retrieved from the FIFO area (in FIFO order) and routed to either the first or second decrypted transport stream 350A or 350B, based upon its PID value. As in the implementations described hereinabove with respect to FIGS. 1 and 2, the PID value indicates its associated packet's origin transport stream. Any packet whose PID indicates that it originated in transport stream 112A is routed to the first decrypted transport stream 352A. Similarly, any packet whose PID indicates that it originated in transport stream 112B is routed to the second decrypted transport stream 352B.

As packets are entered into the merged FIFO area, their decryption indicators are examined, and those packets requiring decryption are sent to the decryption engine 140 by the multi-port SRAM controller. Upon completion of decryption of a packet (i.e., when a packet becomes available at the output of the decryption engine 140) the packet is stored back into the merged FIFO area, overwriting the original encrypted version thereof, thereby requiring no additional space and leaving the sequence of packets in the merged FIFO area undisturbed.

The multi-port SRAM controller 380 permits all of the aforementioned six data transfer processes to operate asynchronously from one another. Synchronization of "pushes" into the FIFO from the front-end process 350 and "pulls" from the FIFO by the back-end process 390 keep the FIFO from overflowing or underflowing.

The back-end process 390 essentially reverses the front-end process 350 by "unmarking" the packets, i.e., restoring the original PID values (stored in the SRAM FIFO along with the packet), and providing a small FIFO buffer between the multi-port SRAM controller and decrypted output transport streams 160A and 160B (whose timing is derived from the independent transport streams 112A and 112B respectively).

A CPU interface controller 332 provides an interface between a host controller (e.g., microprocessor) and the pre-multiplex front-end 310 for the purpose of writing PID maps, controlling the input crosspoint switch 112, etc.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for decrypting a plurality of encrypted transport streams, each transport stream comprising at least two elementary streams each containing a plurality of packets, with a single-stream decryption engine, comprising:

tagging packets of the elementary streams in each of the plurality of encrypted transport streams which are encrypted with a tag value to indicate their origin transport stream;

merging only the tagged packets from the plurality encrypted transport streams which are encrypted into a merged transport stream to be provided to a decryption unit;

decrypting packets in the merged transport stream with the decryption engine to produce a decrypted merged transport stream; and splitting the decrypted merged transport stream into a plurality of decrypted transport streams equal in number to the plurality of encrypted transport streams by routing packets in the decrypted merged transport stream to specific decrypted transport streams according to their tag value, wherein the step of merging only the tagged packets from the plurality encrypted transport streams which are encrypted is performed based on a packet identifier (PID) value within a packet tag, and whereby packets of elementary streams which are not encrypted are passed to an output stream without being processed by the decryption engine.

2. A method according to claim 1, wherein: the decryption engine is a single-chip device.

3. A method according to claim 1, wherein: the encrypted transport streams are MPEG-2 transport streams.

4. A method according to claim 1, further comprising: for each encrypted transport stream, determining a PID value for each encrypted packet, re-mapping the PID values according to a PID map table, and saving the original PID value.

5. A method according to claim 4, wherein: the re-mapped PID values are the tag values.

6. A method according to claim 4, wherein: a match between a PID map table entry and an original PID value indicates that the packet is to be decrypted.

7. A method according to claim 1, wherein: the number of encrypted transport streams is two.

8. An apparatus for decrypting a plurality of encrypted transport streams, each transport stream comprising at least two elementary streams each containing a plurality of packets, with a single-stream decryption engine, comprising:

means for tagging packets of the elementary streams in each of the plurality of encrypted transport streams which are encrypted with a tag value to indicate their origin transport stream;

means for merging only the tagged packets from the plurality encrypted transport streams which are encrypted into a merged transport stream to be provided to a decryption unit;

means for decrypting packets in the merged transport stream with the decryption engine to produce a decrypted merged transport stream; and means for splitting the decrypted merged transport stream into a plurality of decrypted transport streams equal in number to the plurality of encrypted transport streams by routing packets in the decrypted merged transport stream to specific decrypted transport streams according to their tag value, wherein the means for merging only the tagged packets from the plurality encrypted transport streams which are encrypted merges only the tagged packets which are encrypted based on a packet identifier (PID) value within a packet tag, and whereby packets of elementary streams which are not encrypted are passed to an output stream without being processed by the decryption engine.

9. Apparatus according to claim 8, wherein: the decryption engine is a single-chip device.

10. Apparatus according to claim 8, wherein: the encrypted transport streams are MPEG-2 transport streams.

11. Apparatus according to claim 8, further comprising, for each encrypted transport stream: means for determining a PID value for each encrypted packet; means for re-mapping the PID values according to a PID map table; and means for saving the original PID value.

12. Apparatus according to claim 11, wherein: the re-mapped PID values are the tag values.

13. Apparatus according to claim 11, wherein: a match between a PID map table entry and an original PID value indicates that the packet is to be decrypted.

14. Apparatus according to claim 8, wherein: the number of encrypted transport streams is two.

15. Apparatus according to claim 8, wherein: the apparatus is implemented in an FPGA.

16. Apparatus according to claim 8, wherein: the apparatus is implemented in an FPGA with external SRAM.

17. An apparatus for decrypting a plurality of encrypted transport streams, each transport stream comprising at least two elementary streams each containing a plurality of packets, with a single-stream decryption engine, comprising:

a receiver which receives the plurality of encrypted transport streams simultaneously and selects at least two transport streams to be provided to a user as selected transport streams;

a marking unit which tags encrypted packets of the elementary streams in each of the selected transport streams with a tag value to indicate their origin selected transport stream;

a merging unit which merges only the tagged packets from the plurality encrypted transport streams which are encrypted into a merged transport stream;

a decryption unit which decrypts packets in the merged transport stream with the decryption engine to produce a decrypted merged transport stream; and a separating unit which separates the decrypted merged transport stream into a plurality of decrypted transport streams equal in number to the plurality of selected transport streams by routing packets in the decrypted merged transport stream to specific decrypted transport streams according to their tag value, wherein the merging unit merges only the tagged packets from the plurality encrypted transport streams which are encrypted based on a packet identifier (PID) value within a packet tag, and whereby a single decryption engine decrypts each of the selected transport streams, and packets of elementary streams which are not encrypted are passed to an output stream without being processed by the decryption engine.

18. Apparatus according to claim 17, wherein: the decryption engine is a single-chip device.

19. Apparatus according to claim 17, wherein each transport stream of the plurality of transport streams are from a different source.

20. Apparatus according to claim 17, wherein: the encrypted transport streams are MPEG-2 transport streams.

21. Apparatus according to claim 17, further comprising, for each encrypted transport stream: means for determining a PID value for each encrypted packet; means for re-mapping the PID values according to a PID map table; and means for saving the original PID value.

22. Apparatus according to claim 21, wherein: the re-mapped PID values are the tag values.

23. Apparatus according to claim 21, wherein: a match between a PID map table entry and an original PID value indicates that the packet is to be decrypted.

* * * * *

UNITED STATES PATENT AND TRADEMARK OFFICE
CERTIFICATE OF CORRECTION

PATENT NO. : 7,310,423 B2 Page 1 of 1
APPLICATION NO. : 10/422376
DATED : December 18, 2007
INVENTOR(S) : Hobrock et al.

It is certified that error appears in the above-identified patent and that said Letters Patent is hereby corrected as shown below:

COLUMN 8:
Line 63: Please delete "PIED" and replace with --PID--

COLUMN 9:
Line 58: Please delete "1121B" and replace with --121B--
Line 64: Please delete "14A" and replace with --114A--
Line 67: Please delete "1161B" and replace with --116B--

COLUMN 10:
Line 5: Please delete "1121B" and replace with --112B--
Line 5: Please delete "1161B" and replace with --116B--
Line 55: Please delete "discarded." and replace with --discarded--

Signed and Sealed this

Eleventh Day of August, 2009

David J. Kappos
*Director of the United States Patent and Trademark Office*